US012311287B2

(12) United States Patent
Shukla (10) Patent No.: US 12,311,287 B2
(45) Date of Patent: May 27, 2025

(54) VALVE SWITCHING SYSTEM FOR SELECTIVELY INTERCONNECTING COMPONENTS OF A BIOPROCESS INSTALLATION

(71) Applicant: Sartorius Stedim North America Inc., Bohemia, NY (US)

(72) Inventor: Dinesh Shukla, Bolton, MA (US)

(73) Assignee: Sartorius Stedim Biotech GmbH, Goettingen (DE)

( * ) Notice: Subject to any disclaimer, the term of this patent is extended or adjusted under 35 U.S.C. 154(b) by 574 days.

(21) Appl. No.: 17/699,622

(22) Filed: Mar. 21, 2022

(65) Prior Publication Data

US 2023/0294016 A1 Sep. 21, 2023

(51) Int. Cl.
*B01D 15/18* (2006.01)
*F16K 11/22* (2006.01)
*F16K 31/126* (2006.01)

(52) U.S. Cl.
CPC ..... *B01D 15/1842* (2013.01); *B01D 15/1864* (2013.01); *F16K 11/22* (2013.01); *F16K 31/1268* (2013.01)

(58) Field of Classification Search
CPC ............ B01D 15/1842; B01D 15/1864; B01D 15/1821; F16K 11/22; F16K 31/1268; F16K 99/0015; F16K 99/0028; F16K 99/0059; G01N 30/46; G01N 2030/328; G01N 30/38
See application file for complete search history.

(56) References Cited

U.S. PATENT DOCUMENTS

| 7,846,335 B2 | 12/2010 | Bisschops et al. |
| 2008/0053543 A1 | 3/2008 | Baier et al. |
| 2018/0078937 A1* | 3/2018 | Rensch ............ B01L 3/502715 |

FOREIGN PATENT DOCUMENTS

| EP | 1775001 | 4/2007 |
| WO | 2023183315 | 9/2023 |

OTHER PUBLICATIONS

"International Search Report and Written Opinion," for PCT Application No. PCT/US2023/015790 mailed Jul. 3, 2023 (12 pages).
"International Preliminary Report on Patentability," for PCT Patent Application No. PCT/US2023/015790 mailed Oct. 3, 2024 (8 pages).

* cited by examiner

*Primary Examiner* — Waqaas Ali
(74) *Attorney, Agent, or Firm* — Pauly, DeVries Smith & Deffner LLC (57) ABSTRACT

A valve switching system for selectively interconnecting components of a bioprocess installation, comprising a valve switching cassette and an actuator block. It is proposed, that the valve switching cassette comprises a perforated sandwich plate with perforation holes, which sandwich plate is placed between the cassette manifold and the actuator block body.

15 Claims, 5 Drawing Sheets

VALVE SWITCHING SYSTEM FOR SELECTIVELY INTERCONNECTING COMPONENTS OF A BIOPROCESS INSTALLATION

FIELD OF THE TECHNOLOGY

Various embodiments relate to the design of a valve switching system for selectively interconnecting components of a bioprocess installation, a bioprocess installation with such a valve switching system and the use of such a valve switching system.

SUMMARY

The term "bioprocess" presently represents any kind of biotechnological process, in particular biopharmaceutical processes. The operation of a chromatography arrangement with multiple chromatography columns, that are connected to a valve switching system for performing a simulated moving bed (SMB) chromatography, may be part of such a bioprocess.

The proposed valve switching system may be applied in various fields of biotechnology and for different kinds of bioprocesses. For biopharmaceutical processes, cost-efficiency and process reliability are especially relevant. Cost-efficiency is not only related to material costs, but also manufacturing costs. Further, cost-efficiency is also important considering for example the working hours required for equipment installation and the costs for maintenance as well as operation of the bioprocess itself. Process reliability is important in view of the utilized materials, the installation procedure, as well as the correct operation of the bioprocess. Especially in an environment that is highly regulated by authorities (e.g., by the Food and Drug Administration (FDA)), process reliability is crucial to ensure product safety.

For the valve switching system as part of the SMB process related to biopharmaceutical production, it is also the key to ensure a simple installation of the valve switching system. Thus, a disposable and compact design of the individual valves and connectors is essential. A valve switching cassette as part of a valve switching system, designed as a disposable item and with a compact design of the valve switching cassette, is disclosed in EP 1 775 001 A1. In the above noted known valve switching system, which is the starting point for various embodiments, ports and fluid lines of the valve switching cassette are organized in a compact cassette manifold. The fluid lines within the cassette manifold are selectively connected by an array of switchable valve units that are designed as membrane valve units to control the fluid flow within the cassette manifold. The valve units each comprise a valve seat, wherein a respective valve membrane selectively engages the valve seat or disengages the valve seat as to switch the valve units. The valve membrane may be actuated by an actuator. The actuator acts on the valve membrane to switch the valve unit. The actuator is part of an actuator block that is part of the valve switching system. Several actuators may be arranged on an actuator block body.

For actuation of the valve membrane, liquid or gas pressure may be used. To achieve this, the actuator comprises an actuation outlet that leads into an actuator block pocket. The actuator block pocket refers to the part of the actuator block body that the actuation outlet leads into and that has contact points to the valve membrane. These contact points need to be sealed gas- or liquid-tightly as gas or liquid is guided through the actuation outlet towards the valve membrane. To ensure a reliable actuation of the valve membrane, and, consequently, the correct functioning of the valve unit, the contact points between the actuator block and the valve membrane need to be sealed gas- or liquid-tightly.

On the other hand, the valve membrane should be as thin as possible to reduce the material costs and be flexible enough to ensure the reliable actuation of the valve units. If the valve membrane is not flexible enough, the membrane valve may not open and close properly.

Accordingly, the valve membrane of the known arrangement not only fulfils a valve function, but also a sealing function with respect to the cassette manifold and the actuator block. That makes an optimized design of the valve membrane in view of reliability and costs a challenge.

Besides reliable actuation of the valve unit, as described above, also the proper positioning and securing of the valve membrane to the cassette manifold and the actuator block needs to be ensured to enable a leak-free operation of the valve switching system. Proper positioning needs to be ensured during manufacturing, installation, but also operation of the valve switching system. Depending on the type of process that the valve switching system is used with (e.g., a biopharmaceutical process), the materials used need to fulfil certain requirements. For example, materials, especially adhesives used, may need to be certified according to the United States Pharmacopeia (USP) into a certain class (e.g., class VI). Further, the type of connection (e.g., detachable or non-detachable) may be dictated by regulatory authorities like the Food and Drug Administration (FDA). Despite the different requirements the connection between the different parts and the materials themselves may need to fulfil, it is desirable to enable proper positioning of the valve membrane prior to securing to ensure a reproducible and leak-free connection independently of the securing mode.

Various embodiments provide means that enable the reliable switching of the valve units during operation and to enable the reproducible and secure fastening of the valve membrane during manufacturing, installation and operation of the valve switching system.

The above-noted problem is solved by a valve switching system according to the disclosure.

Various embodiments place a perforated sandwich plate between the cassette manifold and the actuator block, wherein its interface to the cassette manifold is provided by the valve membrane and wherein its interface to the actuator block is provided by another membrane, namely a gasket membrane. This way, the constructional designs on both sides of the sandwich plate may be adapted to their individual requirements. For example, the valve membrane may be optimized in view of the valve function, while being encapsulated between the cassette manifold and the sandwich plate. Here it is to be noted that the resulting valve switching cassette can be a single use component, such that the connection between the cassette manifold and the sandwich plate may well be non-detachable.

The gasket membrane may be designed such that it provides optimal sealing between the sandwich plate and the actuator block body, such as, being usable multiple times for different valve switching cassettes. In particular, gas- or fluid-tight sealing between the sandwich plate and the actuator block can be realized by choosing a material for the gasket membrane best suited for air-tight sealing without compromising the functioning of the valve membrane structure to switch the valve units. Since the material of the gasket membrane structure is not in contact with the process fluid within the cassette manifold, the choice of materials is broadened. Further, as gas- or fluid-tight sealing is now enhanced by the gasket membrane structure, the valve membrane structure can be thinner, which results in less costs and a more accentuated switching of the valve units by the valve membrane structure. This contributes to the operational reliability of the valve switching system.

Finally, by placing the sandwich plate between the valve membrane structure and the gasket membrane structure, the sandwich plate can be used for securing, i.e. fastening, of both membrane structures. This enables the preassembly in particular of the gasket membrane structure independently from the actuator block and consequently simplifies the installation procedure of the valve switching system.

Various embodiments are directed to the characteristics of the valve membrane structure and the gasket membrane structure. Some embodiments in particular focus on the valve function of the valve membrane structure and on the sealing function of the gasket membrane structure. Various embodiments are focused on materials used. All these measures contribute to the fact that both membrane structures may be individually selected to suit their respective function in the best way.

According to various embodiments, the gasket membrane structure is perforated with perforation holes, which are at least in part being aligned to the perforation holes of the sandwich plate. It is now easily possible, that the actuation of the valve membrane structure by the actuator is taking place through the perforation holes of the gasket membrane structure.

The cassette manifold and/or the sandwich plate may comprise grooves for inserting the valve membrane structure and/or the gasket membrane structure according to various embodiments. This makes the proper positioning of the respective membrane structure particularly simple.

According to various embodiment it is proposed, that at least part of the perforation holes of the sandwich plate and of the perforation holes of the gasket membrane structure are aligned to the valve seats of the valve units, which results in a compact arrangement with direct access for the respective actuator to the valve membrane structure.

Various embodiments are directed to the valve membrane and/or the gasket membrane comprising membrane stripes. The utilization of membrane stripes reduces the material required for the membrane structures. This way, the overall costs are reduced. Further, proper positioning of the membrane structures is supported.

The sandwich plate may be sealingly engaged with the cassette manifold according to various embodiments, thereby encapsulating and/or securing the valve membrane structure. As indicated above, this can be realized independently from the interface between the sandwich plate and the actuator body, which once more emphasizes the advantage in flexibility in terms of optimized design. In various embodiments, no adhesive is necessary, for example if the compression forces between the cassette manifold and the sandwich plate are used to secure the valve membrane structure. Omitting the use of adhesive to secure the valve membrane structure not only simplifies the manufacturing process as the proper application and choice of adhesive is no longer required, it also increases process safety due to eliminated risk that adhesive might get into contact with process fluid.

An above noted preassembly may easily be realized by securing at least one of the membrane structures to the sandwich plate according to various embodiments. By securing for example the gasket membrane structure to the sandwich plate, an easy preassembly of the gasket membrane structure is possible.

According to various embodiments, each actuator comprises an actuation outlet, such as a gas pressure outlet or a liquid pressure outlet. At least part of the actuation outlets are aligned to the perforation holes of the sandwich plate. This way, the actuation of the valve membrane structure by the actuator can also be controlled by the size of the perforation holes in the sandwich plate, for example. This adds flexibility in operation.

Various embodiments are directed to a bioprocess installation, comprising a chromatography arrangement with multiple chromatography columns, that are connected to a proposed valve switching system, for performing a simulated bed chromatography (SMB) process.

In various embodiments, the use of the proposed valve switching system is provided as such for switching the columns of the bioprocess installation. All explanations given regarding the proposed valve switching system and the proposed bioprocess installation are fully applicable.

Various embodiments provide a valve switching system for selectively interconnecting components of a bioprocess installation, comprising a valve switching cassette and an actuator block, wherein the valve switching cassette comprises a cassette manifold with at least one fluid flow system of ports and fluid lines, which includes primary ports, communicating with primary fluid lines, and secondary ports, communicating with secondary fluid lines, wherein the valve switching cassette comprises an array of switchable valve units for selectively interconnecting the primary fluid lines with the secondary fluid lines via transfer fluid lines, wherein the valve units each comprise a valve seat, wherein the valve switching cassette comprises a valve membrane structure, that may selectively engage the valve seats as to switch the valve units, wherein the actuator block comprises an actuator block body with an actuator for each valve unit, wherein the valve switching cassette comprises a perforated sandwich plate with perforation holes, which sandwich plate is placed between the cassette manifold and the actuator block body, that the valve membrane structure is placed between the cassette manifold and the sandwich plate and wherein a gasket membrane structure is placed between the actuator block body and the sandwich plate and that for selectively switching the valve units, an actuator of the actuator block may act on the valve membrane structure through the perforation holes as to selectively engage the valve seats and that the valve membrane structure comprises at least one valve membrane, which is composed of a first material and that the gasket membrane structure comprises at least one gasket membrane, which is composed of a second material different from the first material.

In various embodiments, the first material comprises a higher degree of hardness than the second material, and/or, that the second material has a higher degree of porosity than the first material, and/or, that at least one valve membrane is thinner than at least one gasket membrane.

In various embodiments, the first material is a first elastomer and the second material is a second elastomer different from the first elastomer.

In various embodiments, at least one valve membrane of the valve membrane structure is composed of a fluorocarbon-based fluoroelastomer material, and/or, that at least one gasket membrane of the gasket membrane structure is composed of a thermoplastic polyester or a thermoplastic vulcanizate or polychloroprene.

In various embodiments, the gasket membrane structure is perforated with perforation holes and that at least part of the perforation holes of the gasket membrane structure are aligned to at least part of the perforation holes of the sandwich plate.

In various embodiments, that the cassette manifold and/or the sandwich plate comprise(s) grooves for inserting the valve membrane structure and/or the gasket membrane structure.

In various embodiments, at least part of the perforation holes of the sandwich plate and of the perforation holes of the gasket membrane structure are aligned to the valve seats of the valve units.

In various embodiments, the valve membrane and/or the gasket membrane comprise(s) membrane stripes.

In various embodiments, the sandwich plate is sealingly engaged with the cassette manifold, encapsulating and/or securing the valve membrane structure.

In various embodiments, the valve membrane structure and/or the gasket membrane structure is/are secured to the sandwich plate, such as by an adhesive.

In various embodiments, each actuator of the actuator block comprises an actuation outlet, such as a gas pressure outlet or a liquid pressure outlet, communicating with an assigned valve seat through a perforation hole of the sandwich plate.

Various embodiments provide a bioprocess installation, comprising a chromatography arrangement with multiple chromatography columns, that are connected to a valve switching system according to the disclosure for performing a simulated bed chromatography process.

Various embodiments provide a use of the valve switching system according to the disclosure for switching the chromatography columns of a chromatography arrangement for performing a simulated bed chromatography process.

BRIEF DESCRIPTION OF THE DRAWINGS

In the following, an embodiment is explained with respect to the drawings. The drawings show FIG. 1 a schematic overview of the proposed valve switching system as part of a proposed bioprocess installation, FIG. 2 an exploded back view of the valve switching system of FIG. 1, FIG. 3 an exploded front view of the proposed valve switching system of FIG. 1, FIG. 4 the working principle of the valve units of the valve switching cassette as part of the valve switching system, FIG. 5 part of the bioprocess installation according to FIG. 1 in an exemplary mode of operation.

DETAILED DESCRIPTION

Figure 1:
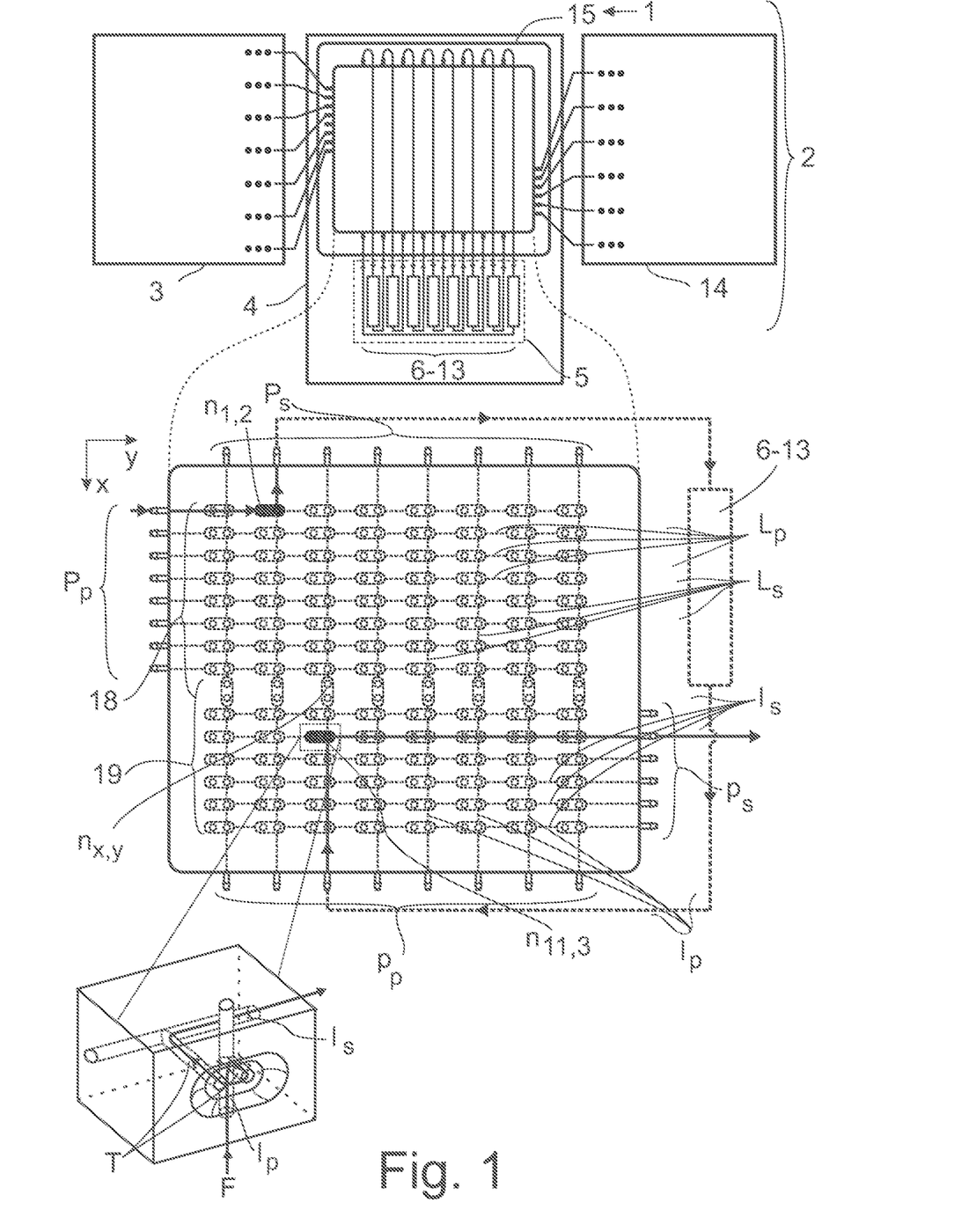

As shown in FIG. 1, the proposed valve switching system 1 here is used for selectively interconnecting components of a bioprocess installation 2. The expression "interconnecting" is to be understood in the sense of a fluid connection.

In particular, FIG. 1 depicts the consecutive steps carried out for recovery and purification of a desired product, such as a monoclonal antibody, as part of the downstream process within a bioprocess. In the first steps of the downstream process, the product is isolated in an isolation unit 3. Assuming that the product is located in the supernatant of the fermentation broth, centrifugation may be carried out to separate the product from the cells and cell debris. To increase the product concentration and to reduce the volume of material to be handled in the consecutive downstream processing steps, concentration, for example by ultrafiltration, may also be carried out as part of the product isolation.

After product isolation in the isolation unit 3, product purification is performed in a purification unit 4. Product purification may be carried out by different means, including multi-column chromatography, as depicted in FIG. 1 by a chromatography arrangement 5. The chromatography arrangement 5 may comprise a plurality of chromatography columns 6-13 as shown in FIG. 1. In various embodiments, the number of chromatography columns 6-13 connected to the valve switching system 1 is between one and eight.

Compared to traditional single column chromatography, multi-column chromatography significantly increases the efficiency of the purification step. However, especially concerning the fluid flow, multi-column chromatography is more complex than single column chromatography. Therefore, advanced control of the fluid flow path is necessary, which presently is achieved by using a proposed valve switching system as shown in FIG. 1.

After purification, polishing of the product can be performed in a polishing unit 14. At the end of product polishing, the product is typically packaged for further distribution. Depending on the bioprocess, the product polishing may for example include a virus inactivation step to comply with regulatory requirements followed by ion exchange chromatography. Another example for product polishing is a crystallisation step to convert the fluid product into a solid, and thereby easily transportable, form.

The valve switching system 1 comprises a valve switching cassette 15, and an actuator block 16, wherein the valve switching cassette 15 comprises a cassette manifold 17 with at least one fluid flow system 18, 19 of ports and fluid lines. A first fluid flow system 18 includes primary ports $P_p$, communicating with primary fluid lines $L_p$, and secondary ports $P_s$, communicating with secondary fluid lines $L_s$. A second fluid flow system 19 includes primary ports $p_p$, communicating with primary fluid lines $l_p$, and secondary ports $p_s$, communicating with secondary fluid lines $l_s$.

The general functionality of the two fluid flow systems 18, 19 of ports and fluid lines is identical, such that explanations given for one fluid flow system 18, 19 are equally applicable for the respective other fluid flow system 18, 19. In the following, reference is made mainly to the second fluid flow system 19, in order to keep complexity down.

The valve switching cassette 15 also comprises an array of switchable valve units $n_{x,y}$, for selectively interconnecting the primary fluid lines $L_p$, $l_p$ with the secondary fluid lines $L_s$, $l_s$ via transfer fluid lines T.

The expression "port" represents the interface for interconnecting components of the bioprocess installation 2 to the respective fluid line. It may include a fluid connector to the respective fluid line.

The expression "line" represents any longitudinal volume, that may hold and guide fluid between two locations. The fluid lines $L_p$, $l_p$, $L_s$, $l_s$, and T are drilled or otherwise machined into the cassette manifold 17, such as by deep hole drilling or the like.

The expressions "primary" and "secondary" are used to differentiate between the two groups of fluid ports to be interconnected by the valve units $n_{x,y}$. In the shown embodiment, those expressions also indicate the direction of fluid flow F, which is then directed from the primary fluid port to the secondary fluid port. However, this can be realized the other way around as well. Accordingly, the expressions "primary" and "secondary" neither imply nor exclude a constructional and/or functional difference between the respective ports and fluid lines.

The expression "selectively interconnecting" means, that one or more of the primary fluid lines $l_p$ may be selected to be interconnected with one or more of the secondary fluid lines $l_s$.

The expression "switchable" refers to the possibility of changing the valve unit $n_{x,y}$ from the state "valve open" to the state "valve closed" or from the state "valve closed" to the state "valve open". If the valve unit $n_{x,y}$ is in the state "valve open", as is exemplarily depicted in the inlay in FIG. 1, fluid may flow from a primary fluid line $l_p$ via transfer fluid lines T into a secondary fluid line $l_s$. In some embodiments, each of the transfer lines T is communicating with a primary fluid line $l_p$ or a secondary fluid line $l_s$. The open valve units $n_{x,y}$ are indicated as solid ovals in FIG. 1 and FIG. 5. If the valve unit $n_{x,y}$ is in the state "valve close", fluid flow from the primary fluid line $l_p$ via the transfer fluid lines T into the secondary fluid line $l_s$ is prevented. The closed valve units are indicated as outlined ovals in FIG. 1 and FIG. 5.

The primary fluid lines $l_p$ and the secondary fluid lines $l_s$ can be arranged in rows and columns within the valve switching cassette 15, wherein the valve units $n_{x,y}$ are located at each junction between a primary fluid line $l_p$ and a secondary fluid line $l_s$, such that the respective fluid lines $l_p$, $l_s$ may be interconnected by the respective valve unit $n_{x,y}$ and the respective transfer fluid lines T. Accordingly, the array of valve units $n_{x,y}$ is aligned to those rows and columns and numbered accordingly. Exemplarily, the valve unit $n_{11,3}$ is shown in detail in the inlay in FIG. 1.

Figure 3:
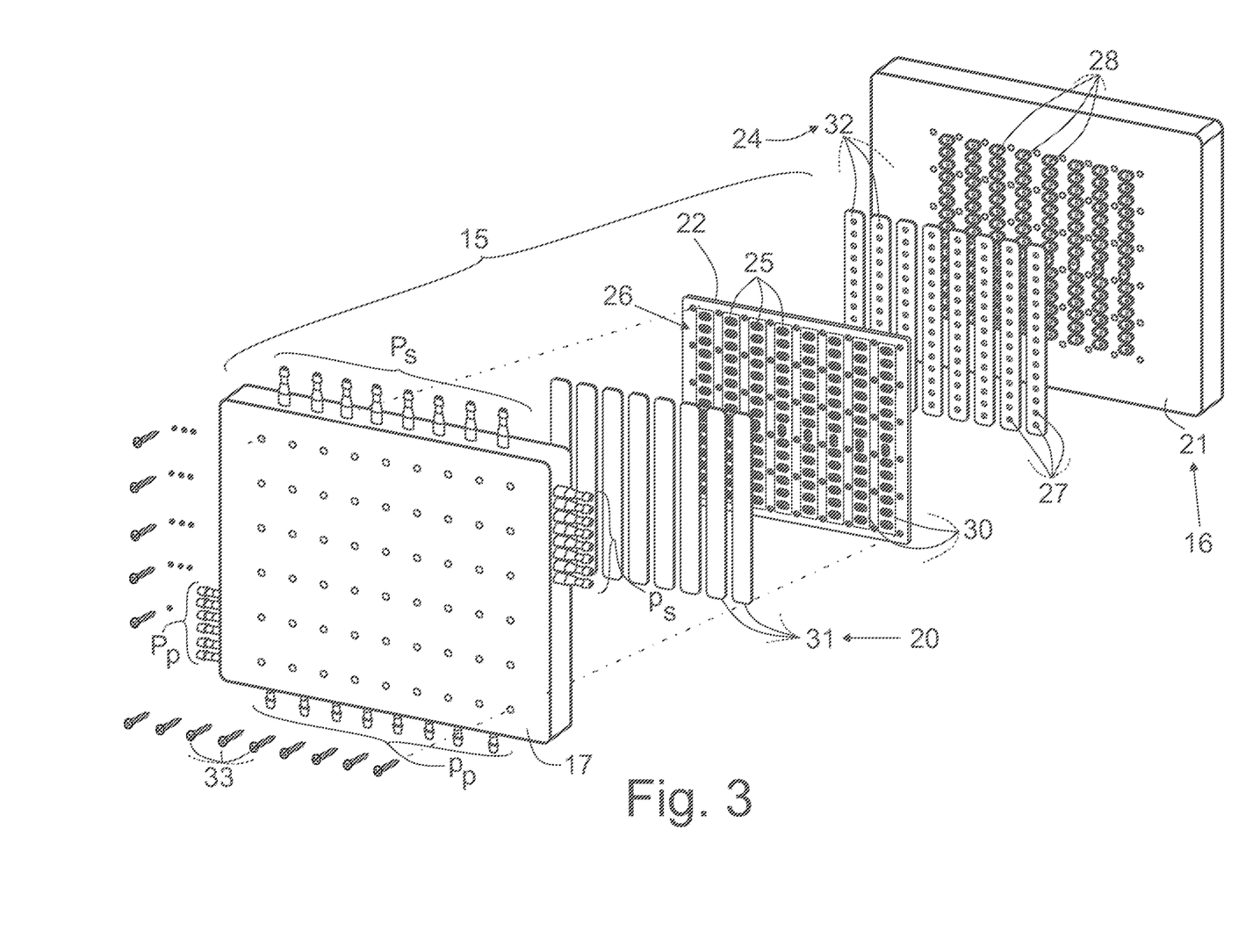

The valve units $n_{x,y}$ each comprise a valve seat $s_{x,y}$. As shown in FIG. 3, for each valve unit $n_{x,y}$, one of the transfer fluid lines T, communicating with a primary fluid line $l_p$, and one of the transfer fluid lines T, communicating with a secondary fluid line $l_s$, such as lead into the valve seat $s_{x,y}$.

In various embodiments, the primary fluid line $l_p$ directly leads into the valve seat $s_{x,y}$ while the secondary fluid line $l_s$ is connected to the valve seat $s_{x,y}$ by a transfer fluid line T.

For controlling the fluid flow, the valve switching cassette 15 of the valve switching system 1 comprises a valve membrane structure 20. The valve membrane structure 20 may sealingly engage the valve seats $s_{x,y}$ of the valve units $n_{x,y}$ as to switch the valve units $n_{x,y}$. The valve membrane structure 20 may selectively engage the valve seat $s_{x,y}$ (state "valve closed") or disengage the valve seat $s_{x,y}$ (state "valve open"), as will be explained later with respect to FIG. 4.

The actuator block 16 further comprises an actuator block body 21 with an actuator for each valve unit $n_{x,y}$ of the valve switching cassette 15. The actuator block 16 may act on the valve membrane structure 20, in particular the valve membrane $m_{x,y}$, which results in the valve membrane structure 20 to engage or disengage the valve seat $s_{x,y}$.

In various embodiments, the proposed valve switching system 1 serves for controlling the fluid flow of a component to be selectively interconnected such as the shown chromatography arrangement 5. The fluids, which flow is controlled by the valve switching system 1, are referred to as process fluids. Process fluids to be handled within the disclosed embodiments can include a wide variety of liquid media such as buffers, wash solutions, acids, bases, culture media, unprocessed product-containing liquids, partly processed product-containing liquids, purified product-containing liquids, sanitation solutions etc. Fluids to be handled within the disclosed embodiments may also be media in the gas phase.

In various embodiments, the valve switching cassette 15 comprises a perforated sandwich plate 22 with perforation holes 23, which sandwich plate 22 with its flat sides is placed between the cassette manifold 17 and the actuator block body 21. The term "perforation hole" is generally to be understood in a broad sense and refers to an opening on the flat side 26 of the respective component, for example the sandwich plate 22, that faces the cassette manifold 17.

The valve membrane structure 20 is placed between the cassette manifold 17 and the sandwich plate 22, while a gasket membrane structure 24 is placed between the actuator block body 21 and the sandwich plate 22. Here, one flat side of the sandwich plate 22 faces the valve membrane structure 20 and the opposite flat side of the sandwich plate 22 faces the gasket membrane structure 24.

Figure 4:
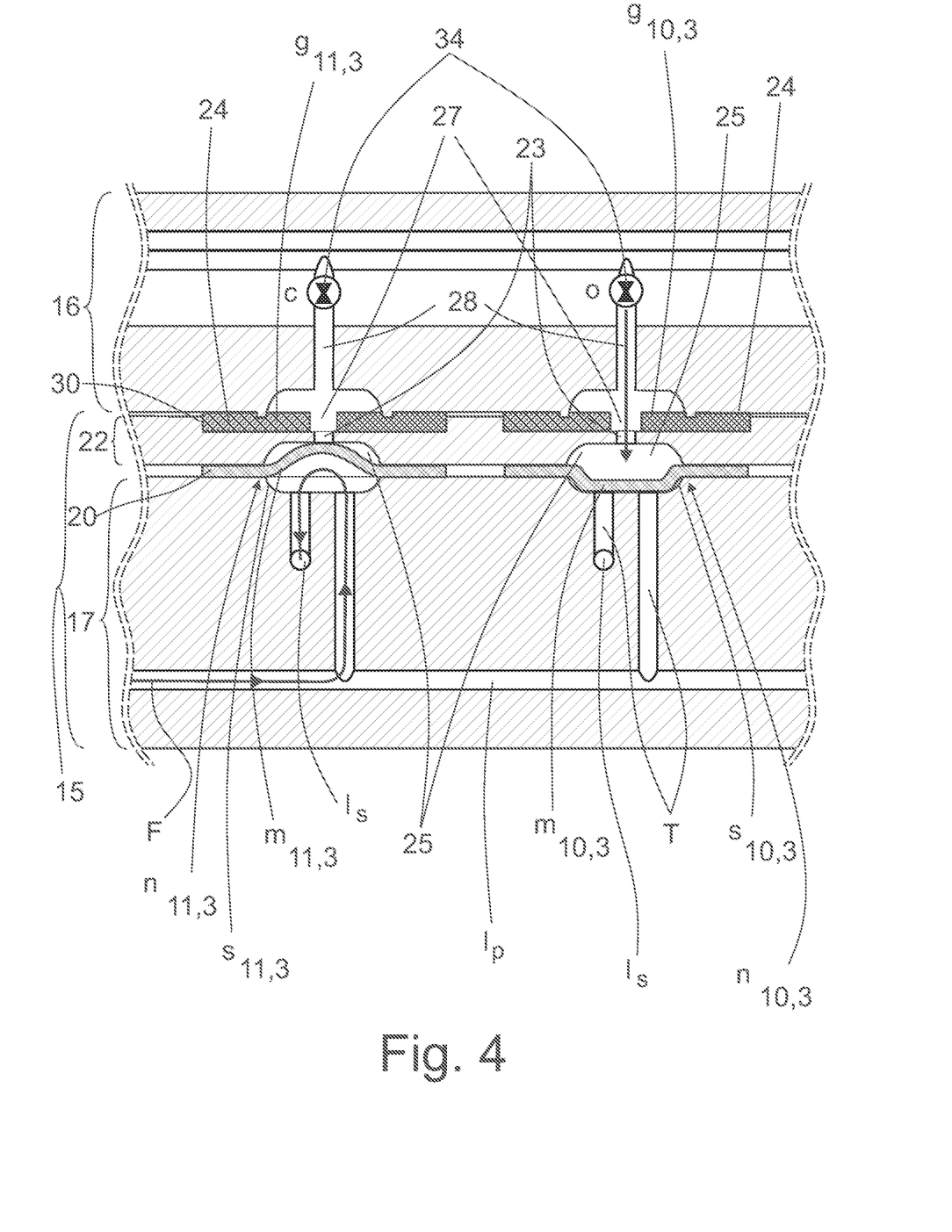

FIG. 4 shows, that for selectively switching the valve units $n_{x,y}$, an actuator of the actuator block 16 may act on the valve membrane structure 20 through the perforation holes 23 of the sandwich plate 22 as to selectively engage the valve seats $s_{x,y}$.

In various embodiments, the valve membrane structure 20 comprises at least one valve membrane $m_{x,y}$, which is composed of a first material and that the gasket membrane structure 24 comprises at least one gasket membrane $g_{x,y}$, which is composed of a second material different from the first material.

Since the valve membrane structure 20 serves the purpose of switching the valve units $n_{x,y}$ and the gasket membrane structure 24 enhances the air-tight sealing between the actuator block 16 and the valve membrane $m_{x,y}$, as noted above, different materials that are each suited to serve the respective purpose best, can be chosen for the valve membrane structure 20 and the gasket membrane structure 24, respectively. In various embodiments, the valve membrane structure 20 comprises at least one valve membrane $m_{x,y}$ and/or the gasket membrane structure 24 comprises at least one gasket membrane $g_{x,y}$.

Besides perforation holes 23, the sandwich plate 22 comprises a recess 25 for each perforation hole 23, to be explained later. Additionally, the sandwich plate 22 comprises fixture holes for introducing fixture elements such as screws, as will be explained later as well.

In various embodiments, the geometry of the perforation holes 23 of the sandwich plate 22 is round. However, also other geometries as oval or squared are envisaged. The recesses 25 in the sandwich plate 22 are located on the flat side 26 of the sandwich plate 22 that faces the valve membrane structure 20. Each recess 25 is assigned at least one perforation hole 23, that can be located in the centre of the recess 25. In various embodiments, the shape and number of the recesses 25 correspond to the shape and number of the valve seats $s_{x,y}$, while at least part of the recesses 25 are aligned to at least part of the valve seats $s_{x,y}$.

Each perforation hole 23 of the sandwich plate 22 forms a channel within the sandwich plate 22. In various embodiments, the channel extends laterally with respect to the respective flat side of the sandwich plate 22.

The sandwich plate 22 may be made of any kind of, potentially acrylic, plastic material such as PMMA, PEEK or PVDF. In particular, the sandwich plate 22 may be manufactured from PEEK, which is a thermoplastic material with high temperature stability. Manufacturing from plastic material makes the sandwich plate 22 lightweight. Additionally, the sandwich plate 22 may be manufactured translucent, which enables a visual inspection of the channels inside the sandwich plate 22. It should be noted that these materials only represent examples, but shall not limit the choice of material for the sandwich plate 22 in any way. In general, the material of the sandwich plate 22 may differ from the material of the cassette manifold 17, meaning that it can for example be chosen to allow the optimum fastening of the valve membrane structure 20 and/or the gasket membrane structure 24.

As the sandwich plate 22 may be constructed from a variety of materials, the methods used for introducing the recesses 25 and perforation holes 23 into the sandwich plate 22 are manifold. Consequently, the perforation holes 23 and recesses 25 may be introduced into the sandwich plate 22 by punching, drilling, injection molding, cutting or the like.

As noted above, the first material assigned to the valve membrane structure 20, and the second material assigned to the gasket membrane structure 24 may be individually laid out.

In some embodiments, the first material comprises a higher degree of hardness and can be thinner than the second material, as for safe switching, the valve function may require the first material to withstand a considerable backpressure.

In addition or as an alternative, it may be, that the second material has a higher degree of porosity than the first material. As the gasket requires a high degree of elasticity, the higher degree of porosity is reasonable. In any case, the porosity of the first material and/or the second material is/are of the kind of closed cell porosity in order to guarantee the required sealing performance.

Again in addition or as an alternative, at least one valve membrane $m_{x,y}$ is thinner than at least one gasket membrane $g_{x,y}$. Compression of the second material of the gasket membrane structure 24 is advantageous in view of the compensation of mechanical tolerances and less relevant or even undesirable for the valve membrane structure 20. In any case, it can be that the first material is a first elastomer and the second material is a second elastomer different from the first elastomer.

In some embodiments, at least one valve membrane $m_{x,y}$ is composed of a fluorocarbon-based fluoroelastomer (FKM), which is a rubber compound that uses vinylidene fluoride as its monomer. The material FKM is robust even when in contact with critical fluids such as a variety of acids and bases as noted above. The hardness (Shore A) lies between 50 and 80, or at 70. The thickness of the valve membrane $m_{x,y}$ can be less than 2 mm or between 0.75 mm and 1.5 mm.

In some embodiments, at least one gasket membrane $g_{x,y}$ is composed of an elastic and flexible elastomer as noted above. As the gasket membrane $g_{x,y}$ is out of contact with any process fluids, a broader choice of materials is possible. Specifically, the material of the gasket membrane $g_{x,y}$ does not necessarily comply with certain requirements for biocompatibility (e.g., USP class VI certification). As no certification is required, the material costs may well be reduced by choosing a material that is not certified. In various embodiments, the material of the gasket membrane $g_{x,y}$ is chosen for best air-tight sealing capabilities. In various embodiments, the gasket membrane $g_{x,y}$ is composed of a thermoplastic polyester (e.g., Hytrel®) or a thermoplastic vulcanizate (e.g., Santroprene™) or polychloroprene (also known as neoprene). However, the material of the gasket membrane $g_{x,y}$ is not limited to the materials listed above, but may be composed of any other material that complies with the requirements stated above and below.

In various embodiments, the hardness (Shore A) of the gasket membrane $d_{x,y}$ lies between 50 and 80, or at 60. In addition or as an alternative, the thickness of the gasket membrane $g_{x,y}$ can be less than 3 mm or between 1 mm and 2 mm.

It should be pointed out, that the overall costs for the valve switching system 1 may well be reduced, even though the gasket membrane structure 24 represents an additional component. The reason for this is, that the savings in valve membrane material, specifically the savings in FKM material, may easily outweigh the costs for the gasket membrane structure 24.

In some embodiments, the gasket membrane structure 24 is perforated with perforation holes 27 as well, wherein at least part of the perforation holes 27 of the gasket membrane structure 24 are aligned to at least part of the perforation holes 23 of the sandwich plate 22. The geometry of those perforation holes 27 of the gasket membrane structure 24 is not restricted as well, e.g. it can be round, oval, or squared. In some embodiments, the perforation holes 27 have a circular geometry. In various embodiments, the number of perforation holes 27 of the gasket membrane structure 24 is identical to the number of actuation outlets 28 of the actuator block 16 and the number of perforation holes 23 of the sandwich plate 22. The perforation holes 27 may be introduced into the gasket membrane structure 24 by punching, drilling, injection molding, cutting or the like.

Here, the cassette manifold 17 and/or the sandwich plate 22 comprise(s) grooves 29, 30 to insert the valve membrane structure 20 and/or the gasket membrane structure 24. Depending on the depth of the grooves 29, 30, the respective membrane structure 20, 24 is in force fit, i.e. clamping, engagement, in form fit engagement or in loose engagement with the enclosing components. The enclosing components are the cassette manifold 17 and the sandwich plate 22 for the valve membrane structure 20 on the one hand and the actuator block body 21 and the sandwich plate 22 for the gasket membrane structure 24 on the other hand.

Figure 2:
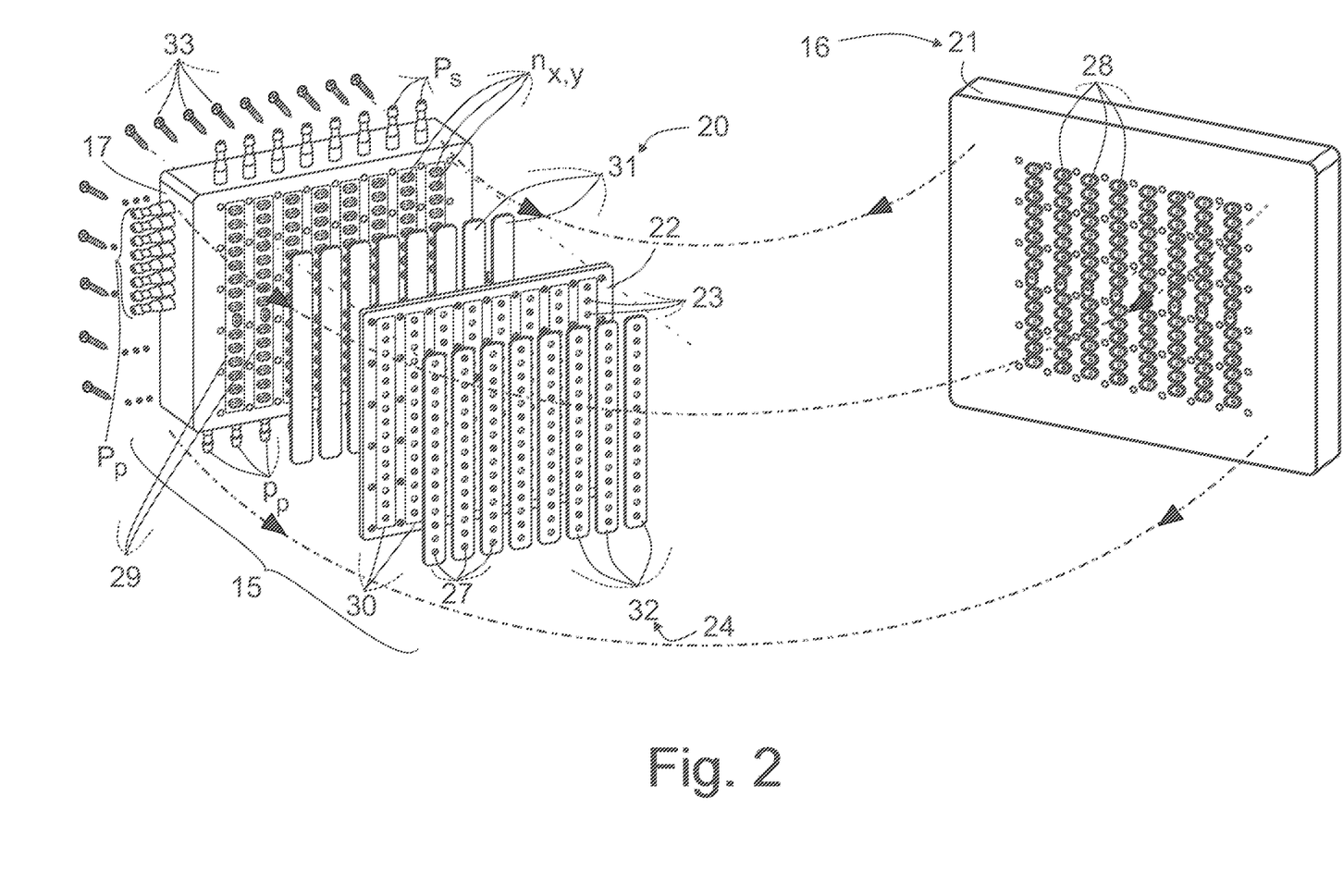

The use of grooves 29, 30 allows the easy installation and proper positioning of the membrane structures 20, 24 prior to fastening. In various embodiments, the shape and number of the grooves 29, 30 corresponds to the shape and respective number of the membrane structure 20, 24. As depicted in FIG. 2 and FIG. 3, the sandwich plate 22 may comprise grooves 29, 30 on either, neither or both flat sides of the sandwich plate 22, while the cassette manifold 17 may comprise grooves 29, 30 on the flat side of the cassette manifold 17, that is located opposite of the flat front side 18 of the cassette manifold 17 (FIG. 2). The grooves 29, 30 may be introduced into the cassette manifold 17 and/or the sandwich plate 22 by punching, drilling, injection molding, cutting or the like.

It is particularly advantageous that the proper positioning of the membrane structures 20, 24, particularly the valve membrane structure 20, using the described grooves 29, 30 omits the use of adhesive to fix the membrane structures 20, 24 in a certain position.

As indicated above, the valve membrane structure 20 and the gasket membrane structure 24 may differ in view of material and/or geometry, in particular thickness, which is advantageous, given that each membrane structure 20, 24 serves a different function. Accordingly, also the depth of the grooves 29, 30 may differ as well.

As can be seen in FIG. 2 and FIG. 3, at least part of the recesses 25 and perforation holes 23 of the sandwich plate 22 and the perforation holes 27 of the gasket membrane structure 24 are aligned to the valve seats $s_{x,y}$ of the valve units $n_{x,y}$. As will be explained in detail below, this contributes to the reliable switching of the valve units $n_{x,y}$.

The realization of the valve units $n_{x,y}$ is particularly simple. In detail, the valve units $n_{x,y}$ are designed as membrane valve units, each with a valve membrane $m_{x,y}$, which may be moved between an open (FIG. 4, valve unit $n_{11,3}$) and a closed position (FIG. 4, valve unit $n_{10,3}$).

The valve units $n_{x,y}$ each comprise a valve seat $s_{x,y}$, wherein the respective valve membrane $m_{x,y}$, provided by the valve membrane structure 20, may selectively engage the valve seat $s_{x,y}$ (state "valve closed") or disengage the valve seat $s_{x,y}$ (state "valve open") as to switch the valve units $n_{x,y}$. As shown in FIG. 4, for each valve unit $n_{x,y}$, each of the fluid lines $l_p$, $l_s$ leads into a transfer fluid line T. In various embodiments, the transfer fluid lines T lead into the valve seat $s_{x,y}$. The valve seat $s_{x,y}$ may sealingly interact with the valve membrane $m_{x,y}$ provided by the valve membrane structure 20.

By aligning the valve seats $s_{x,y}$ to the recesses 25 in the sandwich plate 22, a defined protrusion of the valve membrane $m_{x,y}$ is achieved, when the valve membrane $m_{x,y}$ is disengaged from the valve seat $s_{x,y}$. The reason is that the flexing of the valve membrane $m_{x,y}$ is restricted by the respective recess 25 in the sandwich plate 22. This reduces the mechanical wear of the valve membrane $m_{x,y}$. Further, as the recesses 25 of the sandwich plate 22 and the perforation holes 23 of the sandwich plate 22 are aligned to the centers of the valve seats $s_{x,y}$ (FIG. 4), a defined engagement of the valve membrane $m_{x,y}$ with the valve seat $s_{x,y}$ is achieved.

Due to cost optimization and to enhance proper securing, it can be that the valve membrane structure 20 and/or the gasket membrane structure 24 comprise(s) membrane stripes 31, 32. Here, a groups of membranes $m_{x,y}$, $g_{x,y}$ each add up to a membrane stripe 31, 32.

It is particularly advantageous, if the valve membrane structure 20 comprises membrane stripes 31, because the required membrane material is reduced, if stripes are used. In various embodiments, the number of valve membrane stripes 31 is between two and eight. In various embodiments, the number of valve membrane stripes 31 is equal to the number of primary ports $p_p$ of the valve switching cassette 15. However, it is also imaginable that the valve membrane structure 20 is composed of a single piece. In various embodiments, each valve membrane stripe 31 covers one vertical column of valve seats $s_{x,y}$. This way, the amount of valve membrane material required is significantly reduced while simultaneously the use of membrane stripes supports the easy securing of the valve membrane structure 20 to the cassette manifold 17 as will be explained later.

In addition or as an alternative, the gasket membrane structure 24 also comprises membrane stripes 32. In various embodiments, each gasket membrane stripe 32 covers one vertical column of valve seats $s_{x,y}$. However, it is also imaginable that each stripe 32 covers one horizontal row of valve seats $s_{x,y}$. In various embodiments, the number of gasket membrane stripes 32 is equal to the number of primary ports $p_p$ of the valve switching cassette 15. However, it is also possible to use one gasket membrane stripe 32 to cover several rows and/or columns of valve seats $s_{x,y}$. In various embodiments, the number of gasket membrane stripes 32 is between two and eight. Nevertheless, the gasket membrane structure 24 could also be manufactured as a single piece. Also, for the gasket membrane structure 24, the use of stripes results in less material required, which reduces the overall material costs.

In various embodiments, the number and orientation of the membrane stripes 31 of the valve membrane structure 20 and the membrane stripes 32 of the gasket membrane structure 24 is identical. However, it is also imaginable that the number of membrane stripes 32 of the gasket membrane structure 24 is smaller or larger than the number of membrane stripes 31 of the valve membrane structure 20 and that the orientation of those stripes differs. In various embodiments, the membrane stripes 31, 32 have a certain cross-sectional form, such as an arcuate, a polygonal, in particular a rectangular form.

The above noted grooves 29, 30 in the cassette manifold 17 and/or the sandwich plate 22 are particularly beneficial for proper positioning of the valve membrane stripes 31. By inserting the valve membrane stripes 31 into the grooves 29, 30 in the cassette manifold 17 and/or the sandwich plate 22, the valve membrane stripes 31 can be completely encapsulated between the cassette manifold 17 and the sandwich plate 22. This way, a completely sealed design of the valve membranes $m_{x,y}$ is achieved. Besides reducing the bioburden ingress, this encapsulated design contributes to enhancing the fluid-tight sealing between the cassette manifold 17 and the valve membrane $m_{x,y}$ as well as the gas- and/or fluid-tight sealing between the valve membrane $m_{x,y}$ and the sandwich plate 22 and thereby increases the reliable operation of the valve switching system 1 by ensuring the reliable switching of the valve units $n_{x,y}$.

The completely sealed design of the valve membrane structure 20 largely reduces a potential bioburden ingress into the cassette manifold 17 as indicated above, particularly into the fluid lines $l_p$, $l_s$ and valve seats $s_{x,y}$. The only potential entry point for contaminants (e.g., bacteria) in this case are the perforation holes 23 of the sandwich plate 22. However, even if contaminants would enter the valve switching cassette 15 through the perforation holes 23, an ingress into the fluid lines $l_p$, $l_s$ and valve seats $s_{x,y}$ is still largely prevented by the fluid-tight connection between the cassette manifold 17 and the valve membrane structure 20, particularly the valve membrane $m_{x,y}$. Consequently, the area for potential bioburden ingress is largely reduced compared to a design in which the valve membrane structure 20 is not fully encapsulated. Additionally, by the sealed and encapsulated design, the valve membrane structure 20 is protected against damaging.

As the grooves 29, 30 in the sandwich plate 22 and/or the cassette manifold 17 can be used for proper positioning of the valve membrane stripes 31, no adhesive is needed to fix the valve membrane stripes 31 prior to assembly. This greatly simplifies the manufacturing process and eliminates all disadvantages related to the use of adhesive that are discussed within this application. However, as described above, adhesive may still be used to secure the valve membrane structure 20.

In FIG. 2 and FIG. 3, the fixture elements 33 such as screws are passed through between the valve membrane stripes 31. This greatly simplifies the installation and manufacturing of the valve membrane structure 20 as the valve membrane structure 20 does not need to comprise additional holes or the like for pass through of the fixture elements 33. The valve membrane stripes 31 are secured between the cassette manifold 17 and the sandwich plate 22 indirectly by the fixture elements 33.

A fluid-tight, secure mechanical connection needs to be established between the cassette manifold 17 and the valve membrane structure 20 to ensure the leak-free operation of the valve switching system 1 and to prevent the ingress of contaminants (e.g., bacteria) into the cassette manifold 17. Additionally, the mechanical connection between the actuation outlet 28 and the sandwich plate 22 needs to be gas- or fluid-tight to enable the reliable pass through of gas or liquid from the actuation outlet 28 to the valve membrane structure 20. As the gasket membrane structure 24 and the sandwich plate 22 are arranged between the valve membrane structure 20 and the actuation outlet 28, they also need to be connected in a fluid- or gas-tight manner.

The mechanical connection between the cassette manifold 17 and the valve membrane structure 20 may be realized by using adhesive. The adhesive may be applied to the valve membrane structure 20 and/or the cassette manifold 17 directly.

Here, the cassette manifold 17 comprises an adhesive channel system (not shown) to introduce the adhesive. The adhesive channel system may be machined into the cassette manifold 17 by injection molding, drilling or the like. The adhesive channel system may comprise riser channels to introduce the adhesive after the valve membrane structure 20, specifically the valve membrane $m_{x,y}$, has already been positioned on the cassette manifold 17. Further, as the adhesive is applied into the channel system, the adhesive is applied in a defined manner and the application can be controlled. The advantage here is that the adhesive is applied in a reproducible and consistent way. Further, as the riser channels enable the application of adhesive when the valve membrane structure 20 has already been positioned, the valve membrane $m_{x,y}$ can be positioned correctly, before it is secured to the cassette manifold 17. This simplifies the securing of the valve membrane structure 20.

The mechanical connection between the cassette manifold 17 and the sandwich plate 22 may be realized in a detachable or in a non-detachable way.

The detachable connection may be realized by using an appropriate number of fixture elements 33 (FIG. 2 and FIG. 3) such as screws. In various embodiments, the sandwich plate 22 and the cassette manifold 17 comprise fixture holes for inserting the fixture elements 33. This enables the reuse of certain parts (e.g., the sandwich plate 22), if desired. Alternatively, such a detachable connection may by realized by clamps or the like.

According to various embodiments, a non-detachable connection may be realized between the sandwich plate 22 and the cassette manifold 17. In various embodiments, such mechanical connection may be realized by diffusion bonding, adhesive, riveting, welding or the like. Such a non-detachable connection is especially desirable to reduce the bioburden ingress. Additionally, and as already mentioned above, a permanent connection may also be required by regulatory authorities.

In the case that the cassette manifold 17 and the sandwich plate 22 are connected in a non-detachable manner, the valve membrane structure 20 can be connected to both parts by clamping the valve membrane structure 20 between the cassette manifold 17 and the sandwich plate 22 without the need for fixture elements or adhesive. In this case, the sandwich plate 22 is sealingly engaged with the cassette manifold 17, encapsulating and/or securing the valve membrane structure 20.

As noted above, the valve switching cassette 15 can be designed as a single use component. In addition or as an alternative, the actuator block 16 can be a multiple use component.

The mechanical connection between the preassembled valve switching cassette 15 (including the sandwich plate 22 and the valve membrane structure 20 and, in some embodiments, also the gasket membrane structure 24) and the actuator block 16 can be a detachable connection, which may be realized in different ways. For example, the connection may be achieved by applying pressure to the valve switching cassette 15 and the actuator block 16 to join both parts, such as into a formfit. In an alternative embodiment, the actuator block 16 may comprise openings for the insertion of fixture elements 33 such as screws (FIG. 3).

Additionally or alternatively, the valve membrane structure 20 and/or the gasket membrane structure 24 may be secured to the sandwich plate 22, in particular using adhesive. The advantage here is that the adhesive is out of contact with the process fluids and consequently does not have to adhere to the same strict requirements that are needed, if the adhesive is in contact with the cassette manifold 17 and, thus, potentially with the process fluids. For example, the adhesive does not need to be certified as class VI according to the General Chapter 88 of the United States Pharmacopeia and National Formulary (USP-NF). As a result, the variety of adhesives to choose from is increased. Additionally, also the material of the sandwich plate 22 can be optimized for optimum bonding between the valve membrane structure 20 and the sandwich plate 22. This is particularly advantageous, if the valve membrane material is restricted to FKM, as the material of the sandwich plate 22 can then be chosen to be compatible with the adhesive used for bonding.

The mechanical connection between the gasket membrane structure 24 and the sandwich plate 22 needs to be gas- or liquid-tightly to enable the reliable actuation of the valve membrane $m_{x,y}$ by gas or liquid pressure.

The gasket membrane structure 24 and the sandwich plate 22 can be connected by an adhesive. The connection by an adhesive is particularly simple, because as the adhesive is out of contact with the process fluids, the requirements for the adhesive are reduced. Specifically, the adhesive does not need to be certified as class VI according to the General Chapter 88 of the USP-NF as noted above.

The gasket membrane structure 24 may be connected to the sandwich plate 22 before or after sterilization. In various embodiments, the gasket membrane structure 24 is connected to the sandwich plate 22 before sterilization. In this case, the adhesive has to comply with the sterilization conditions, which means that it has to keep its structural integrity and maintain the connection between the sandwich plate 22 and the gasket membrane structure 24 during and after sterilization. In various embodiments, the adhesive needs to withstand a certain level of gamma irradiation without losing its bonding capabilities and/or structural integrity. In various embodiments, the dosing level of the gamma irradiation the adhesive has to withstand is between 25 and 75 kGy, such as at 50 kGy.

The valve switching cassette 15, comprising the cassette manifold 17, the valve membrane structure 20, the sandwich plate 22, and, in some embodiments, also the gasket membrane structure 24, can be preassembled and sterilized independently from the actuator block 16. During installation, only the preassembled and already sterilized valve switching cassette 15 needs to be connected to the actuator block 16. This greatly simplifies the installation procedure, as less parts need to be assembled and connected by the operator.

As noted above and as shown in FIG. 4, each actuator block 16 comprises an actuation outlet 28 for acting on the valve membrane structure 20, specifically for acting on the valve membrane $m_{x,y}$. Through the actuation outlet 28, a pressure, such as by gas or liquid, is exerted on the valve membrane $m_{x,y}$. In various embodiments, pressure by compressed air is used for actuation.

By applying liquid or gas pressure through the actuation outlet 28, the valve membrane structure 20 is actuated. In particular, the valve membrane $m_{x,y}$ is actuated, which results in the valve membrane structure 20 coming into sealing engagement with the valve seat $s_{x,y}$. This is depicted for the valve unit $n_{10,3}$ in FIG. 4. If the liquid or gas pressure is withdrawn, the pressure of the process fluids distributed inside the cassette manifold 17 causes the valve membrane structure 20, in particular the valve membrane $m_{x,y}$, to flex against the recesses 25 in the sandwich plate 22. This flexing results in the valve membrane $m_{x,y}$ of the valve membrane structure 20 coming out of sealing engagement with the valve seat $s_{x,y}$. This is depicted for the valve unit $n_{11,3}$ in FIG. 4.

It may be pointed out, that the expression "coming into sealing engagement" represents establishing a fluid-tight sealing, normally force fit engagement between the valve membrane structure 20 and the valve seat $s_{x,y}$, while the expression "coming out of sealing engagement" may include a loose contact between the valve membrane structure 20 and the valve seat $s_{x,y}$, which however is not fluid-tight.

A particular advantage of actuating the valve membrane structure 20 by gas or liquid pressure is that the pressure can be precisely controlled. Consequently, the valve unit $n_{x,y}$ can be switched in a controlled and accentuated manner between the opened and closed position or between the closed and opened position.

As depicted in FIG. 4, a control valve 34 may be used to control the pressure in the actuation outlet 28. If the control valve 34 is opened (indicated by the letter "o" in FIG. 4), and the pressure introduced into the recess 25 through the actuation outlet 28 is larger than the pressure exerted on the valve membrane $m_{x,y}$ by the process fluid flow F, the valve membrane $m_{x,y}$ is actuated, as explained above. If the control valve 34 is closed (indicated by the letter "c" in FIG. 4), the current pressure is maintained within the recess 25. Depending on the pressure difference between the pressure exerted by the process fluid flow F and the pressure in the recess 25, the flexing of the valve membrane $m_{x,y}$ can be controlled in a precise manner. It is also imaginable that the control valve 34 is a blow-off valve that maintains a certain pressure in the recess 25.

The actuator block 16 may be controlled by an electronic control (not shown), including a microprocessor, operated based on a control software. Here it becomes apparent that the complete process fluid flow F can be flexibly and precisely controlled electronically just by a corresponding modification of the control software.

According to various embodiments, the bioprocess installation 2 is provided as such. The proposed bioprocess installation 2 comprises a chromatography arrangement 5 with multiple chromatography columns 6-13, that are connected to a proposed valve switching system 1 as shown in FIG. 1, for performing a simulated moving bed (SMB) chromatography process for example. Reference is made to all explanations given with respect to the first teaching.

Figure 5:
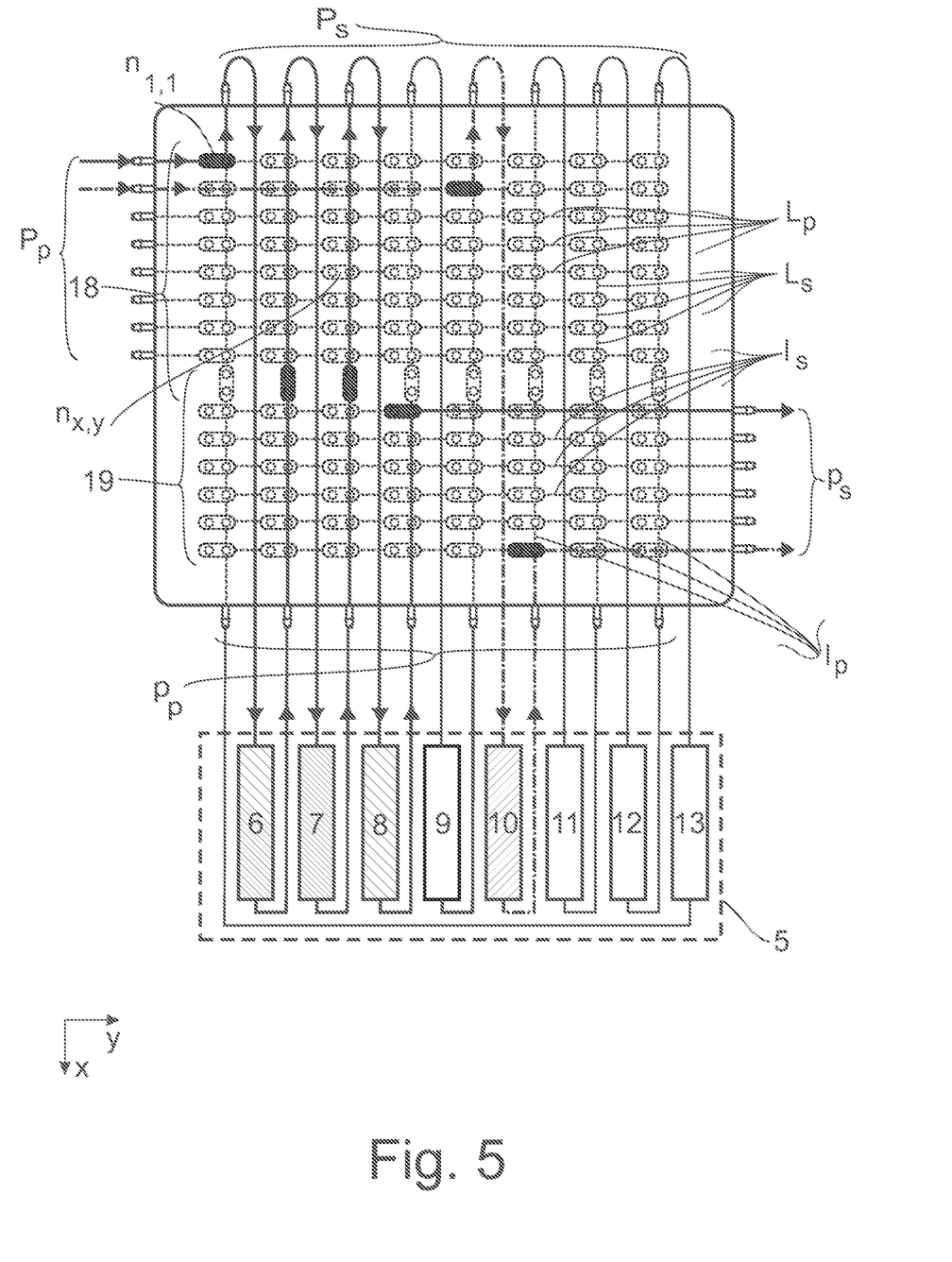

FIG. 5 shows an exemplary operation of the proposed valve switching system 1. Here it becomes clear, that numerous variants of sequential and parallel utilization of the chromatography columns 6-13 are possible. While the chromatography columns 6, 7, 8 are utilized in sequence, the chromatography column 10 is utilized in parallel thereto. All in all, fluid flow F can be directed from any one of the inlets provided by primary ports $P_p$ of the first fluid flow system 18 to any one of the outlets provided by the secondary fluid ports $p_s$ of the second fluid flow system 19, utilizing any number of chromatography columns 6-13 in any desired sequential or parallel manner.

A further independent teaching is directed to the use of the proposed valve switching system 1 for switching the chromatography columns 6-13 of a chromatography arrangement 5 for performing a simulated bed chromatography (SMB) process. Again, reference is made to all explanations given for the previous teachings.

The invention claimed is:

1. A valve switching system for selectively interconnecting components of a bioprocess installation, comprising a valve switching cassette and an actuator block, wherein the valve switching cassette comprises a cassette manifold with at least one fluid flow system of ports and fluid lines, which includes primary ports, communicating with primary fluid lines, and secondary ports, communicating with secondary fluid lines, wherein the valve switching cassette comprises an array of switchable valve units for selectively interconnecting the primary fluid lines with the secondary fluid lines via transfer fluid lines, wherein the valve units each comprise a valve seat, wherein the valve switching cassette comprises a valve membrane structure, that can selectively engage the valve seats as to switch the valve units, wherein the actuator block comprises an actuator block body with an actuator for each valve unit, wherein the valve switching cassette comprises a perforated sandwich plate with perforation holes, which sandwich plate is placed between the cassette manifold and the actuator block body, that the valve membrane structure is placed between the cassette manifold and the sandwich plate and wherein a gasket membrane structure is placed between the actuator block body and the sandwich plate and that for selectively switching the valve units, an actuator of the actuator block can act on the valve membrane structure through the perforation holes as to selectively engage the valve seats and that the valve membrane structure comprises at least one valve membrane, which is composed of a first material and that the gasket membrane structure comprises at least one gasket membrane, which is composed of a second material different from the first material.

2. The valve switching system according to claim 1, wherein the first material comprises a higher degree of hardness than the second material, and/or, that the second material has a higher degree of porosity than the first material, and/or, that at least one valve membrane is thinner than at least one gasket membrane.

3. The valve switching system according to claim 1, wherein the first material is a first elastomer and the second material is a second elastomer different from the first elastomer.

4. The valve switching system according to claim 1, wherein at least one valve membrane of the valve membrane structure is composed of a fluorocarbon-based fluoroelastomer material, and/or, that at least one gasket membrane of the gasket membrane structure is composed of a thermoplastic polyester or a thermoplastic vulcanizate or polychloroprene.

5. The valve switching system according to claim 1, wherein the gasket membrane structure is perforated with perforation holes and that at least part of the perforation holes of the gasket membrane structure are aligned to at least part of the perforation holes of the sandwich plate.

6. The valve switching system according to claim 1, wherein that the cassette manifold and/or the sandwich plate comprise(s) grooves for inserting the valve membrane structure and/or the gasket membrane structure.

7. The valve switching system according to claim 1, wherein at least part of the perforation holes of the sandwich plate and of the perforation holes of the gasket membrane structure are aligned to the valve seats of the valve units.

8. The valve switching system according to claim 1, wherein the valve membrane and/or the gasket membrane comprise(s) membrane stripes.

9. The valve switching system according to claim 1, wherein the sandwich plate is sealingly engaged with the cassette manifold, encapsulating and/or securing the valve membrane structure.

10. The valve switching system according to claim 1, wherein the valve membrane structure and/or the gasket membrane structure is/are secured to the sandwich plate.

11. The valve switching system according to claim 1, wherein each actuator of the actuator block comprises an actuation outlet communicating with an assigned valve seat through a perforation hole of the sandwich plate.

12. A bioprocess installation, comprising a chromatography arrangement with multiple chromatography columns, that are connected to a valve switching system according to claim 1 for performing a simulated bed chromatography process.

13. A method comprising switching chromatography columns of a chromatography arrangement for performing a simulated bed chromatography process with the valve switching system according to claim 1.

14. The valve switching system according to claim 1, wherein the valve membrane structure and/or the gasket membrane structure is/are secured to the sandwich plate by an adhesive.

15. The valve switching system according to claim 11, wherein the actuation outlet is a gas pressure outlet or a liquid pressure outlet.

* * * * *